United States Patent

[11] 3,572,777

| [72] | Inventors | Thomas L. Blose<br>Bradfordwoods;<br>Emilio A. Pontill, Conway, Pa. |
|---|---|---|
| [21] | Appl. No. | 821,842 |
| [22] | Filed | May 5, 1969 |
| [45] | Patented | Mar. 30, 1971 |
| [73] | Assignee | Armco Steel Corporation<br>Middletown, Ohio |

[54] MULTIPLE SEAL, DOUBLE SHOULDER JOINT FOR TUBULAR PRODUCTS
8 Claims, 4 Drawing Figs.

[52] U.S. Cl......................................................... 285/334,
285/351
[51] Int. Cl....................................................... F16l 25/00
[50] Field of Search............................................ 285/333,
334, 355, 390, 369, 55 (part), 351

[56] References Cited
UNITED STATES PATENTS

| 3,100,656 | 8/1963 | MacArthur................... | 285/333X |
| 3,224,799 | 12/1965 | Blose et al. .................... | 285/334 |
| 3,266,821 | 8/1966 | Safford......................... | 285/55X |
| 3,359,013 | 12/1967 | Knox et al..................... | 285/334X |

FOREIGN PATENTS

| 1,489,013 | 6/1967 | France .......................... | 285/334 |
| 412,446 | 6/1934 | Great Britain................ | 285/390 |

*Primary Examiner*—Dave W. Arola
*Attorney*—Melville, Strasser, Foster and Hoffman ABSTRACT: A threaded and coupled, or integral connection for tubular products (such as tubing, casing and drill pipe used in oil country service) comprising complementary tapered sealing surfaces, an annular external shoulder on the male element, and an annular internal shoulder on the female element, at least one of which shoulders provides a secondary seal.

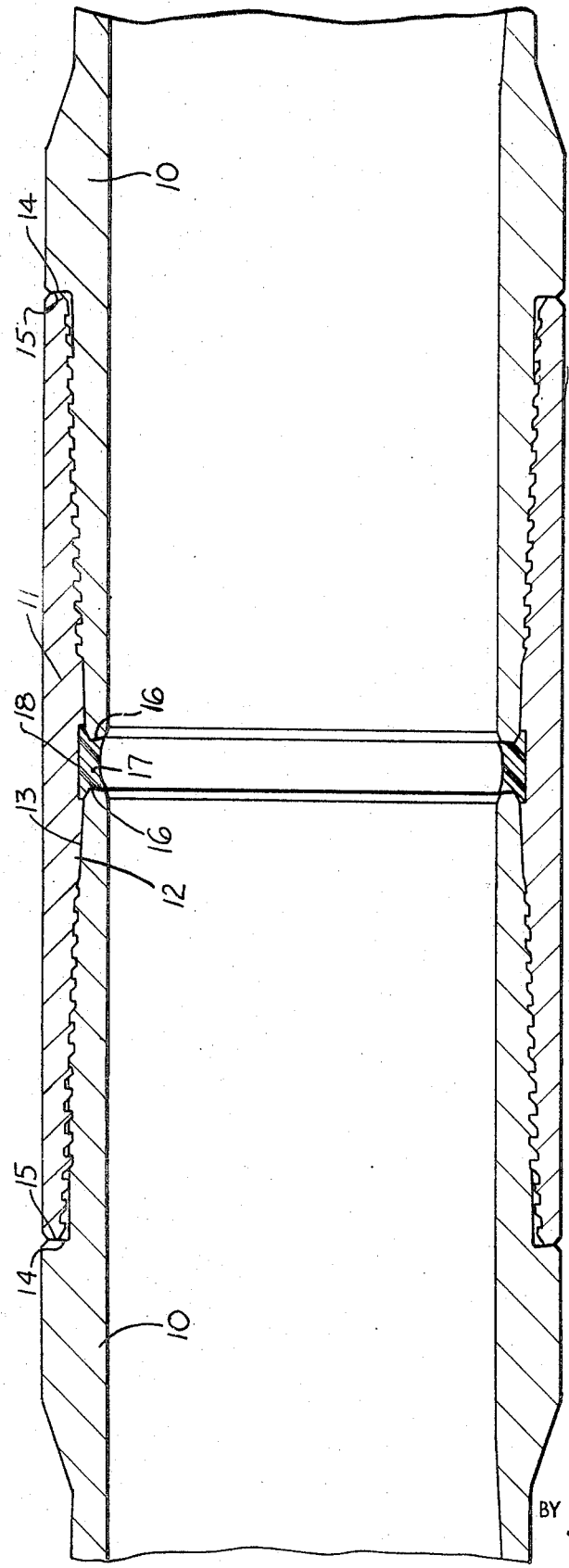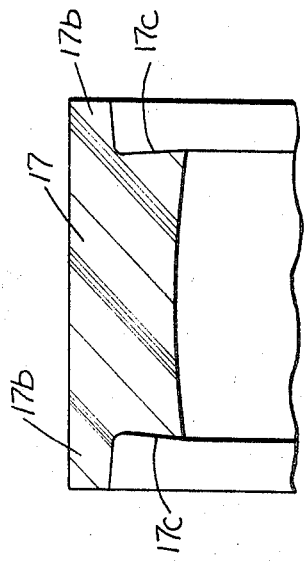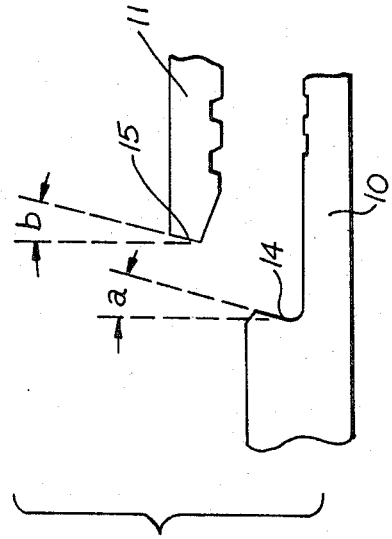

MULTIPLE SEAL, DOUBLE SHOULDER JOINT FOR TUBULAR PRODUCTS

BRIEF SUMMARY OF THE INVENTION

The male and female elements are provided with complementary tapered sealing surfaces which may be provided with a so-called phonograph finish as disclosed and claimed in U.S. Pat. No. 3,224,799, dated Dec. 21, 1965. The engageable threads are of relatively long pitch and are disposed on a relatively steep taper. The female member is provided with full threads and the male member is provided with vanishing threads. When the joint is made up, the threads on the male member are engaged throughout their length. The form of the threads may be as disclosed and claimed in said U.S. Pat. No. 3,224,799 or it may be of the acme or buttress types, or modifications thereof.

The male member is provided with an annular external shoulder adapted to be abutted by the end of the female member when fully made up, and the female member is provided with an annular internal shoulder adapted to be abutted by the end of the male member. While the male and female members may abut the respective shoulders substantially at the same time, the machining tolerances will permit either shoulder to abut first, allowing a maximum standoff of the second shoulder (measured axially of the joint) of 0.010 inch. Thus the initially butted shoulder may undergo an axial deformation of 0.010 inch maximum, which deformation may take place on either member or be distributed between the two joint members, before the secondary shoulder abuts. This 0.010 inch axial deformation is determined not to be harmful to the functional requirements of the connection.

For oil country service where noncorrosive fluids or gases are conducted, the internal shoulder of the box or female member should be integral with that member and have the tolerances indicated above.

For oil country service and other applications where the product is used for conducting corrosive fluids or gases, the internal shoulder of the box or female member is constituted by a separate element of a plastic or other suitable corrosion resistant material but having the same configuration as when the shoulder is integral. Where the separate element is provided the machining tolerances are made such that the end of the pin member abuts the internal shoulder of the box or female member substantially before the external shoulder abuts. This is to insure that the end of the pin member always makes sealing contact with the corrosion resistant internal shoulder. Since the tubing or pipe product which is used for conducting a corrosive medium will be lined with a corrosion resistant material which will extend over the radial face of the end of the pin member, the sealing at the shoulder interface will be effected by the axial interference between two plastic or corrosion resistant surfaces.

The complementary taper surfaces provide a primary seal and one of the coacting element ends and shoulders provides a secondary seal. The secondary seal is preferably provided by the abutment of the end of the male member with the gasket seated against the shoulder of the female member. The shoulders and the corresponding ends of the two members are undercut to a slight degree so as to interlock with the respective mating member. The undercutting of the internal shoulder insures that there will be no separation of the secondary seal when the joint is under tension load and subjected to the internal pressure of fluids.

BRIEF DESCRIPTION OF THE DRAWINGS

FIG. 2 is a view similar to FIG. 1 showing the use of the separate element of plastic to provide the internal shoulders of the box.

FIG. 3 is an enlarged view similar to FIG. 2 showing the gasket member.

FIG. 4 is an exploded view of a male and female member showing the undercutting.

DETAILED DESCRIPTION

Figure 1:
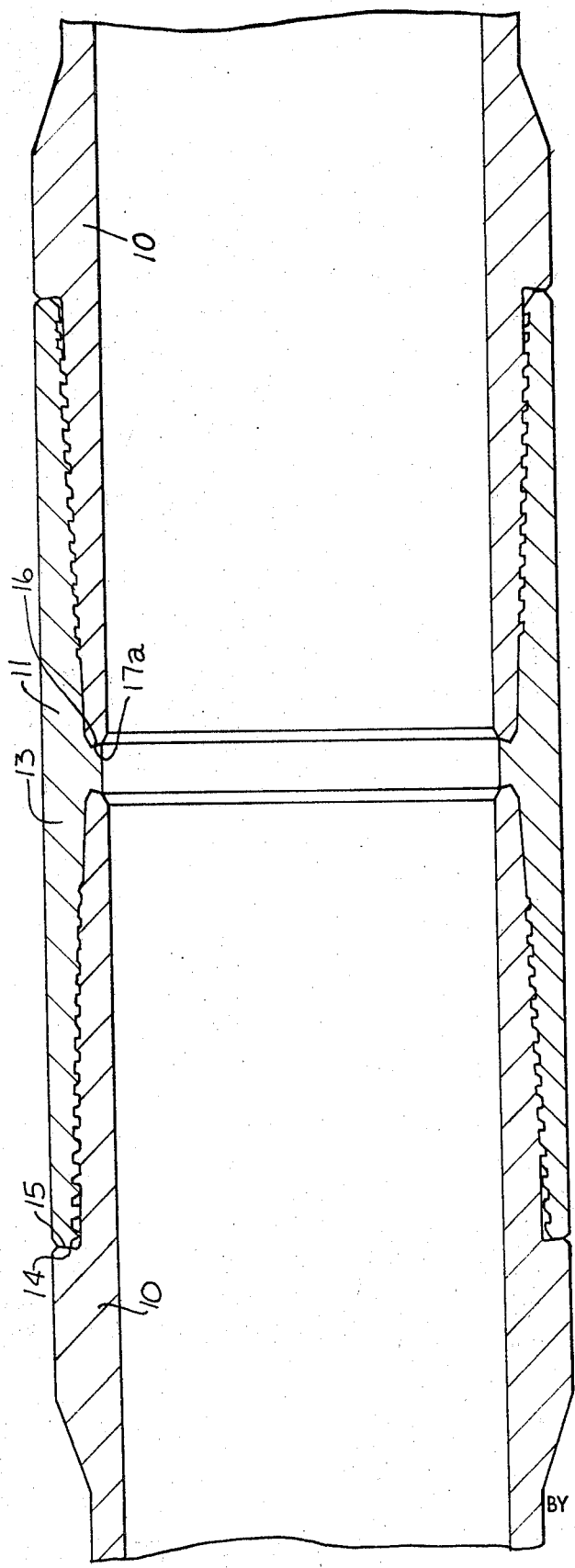
FIG. 1 is a fragmentary cross-sectional view of a coupling with two sections of pipe in engagement therewith. The two ends of the coupling constitute female members and the ends of the two pieces of pipe constitute male members.

In FIG. 1 there are shown two sections of pipe indicated at 10. It will be understood that these may be tubing, casing or drill pipe such as used in gas and oil wells. It should also be noted at this point that while the drawing shows a threaded and coupled joint, the invention is equally applicable to a so-called integral or upset joint wherein the threaded portion of the pipe is thickened by a forging technique so as to provide more metal in the area where the threads are cut.

The box or female coupling member in FIG. 1 is indicated at 11 and as will be clear has internal threads at each end to engage the end of a section of pipe.

As indicated heretofore, the specific form of the threads is not a limitation upon this invention, although preferably the threads will be such as are taught in said U.S. Pat. No. 3,224,799. In any event, the threads are disposed on a taper and the male element preferably has vanishing threads while the female member has full threads. This permits ease of machining for economical manufacture and simplifies field shop reproduction. The female member can be threaded with a standard type tapping head and the pin member can be threaded by the use of a conventional lathe.

The pin or male member 10 has an external tapered sealing surface 12 and the female member has an internal tapered sealing surface 13. The surfaces 12 and 13 are complementary. These surfaces preferably are provided with a so-called phonograph finish which is described in detail in the aforementioned patent. These complementary surfaces provide a primary seal and insure a leak-tight mating at the seal surfaces even if the makeup of the joint is not the full intended amount. The phonograph surface not only produces an excellent seal but prevents galling when the joint is disassembled and reassembled a plurality of times.

The male member is provided with an external annular shoulder 14 and this shoulder is undercut as seen clearly in FIG. 4, wherein the angle $a$ is from about 5° to about 10°. The cooperating end of the female member 11 also has an undercut surface 15 and the angle $b$ is the same as the angle $a$. Abutment of the surfaces 14 and 15 may produce a secondary seal. The angled male shoulder and female end prevent disengagement.

If the angles $a$ and $b$ are less than 5°, the end 15 of the female member 11 will climb up and out of contact with the shoulder 14 of the male member when high torque is applied. On the other hand, if the angles are greater than about 10°, the joint also will not function properly. The problem here is that the unsupported thread portion at the end of the female member will bow or turn inward if the angles are large enough to cause a component of force along the mating surfaces which plastically deforms the end of the female member and moves it radially inwardly. The result is that the deformed end of the box will cause thread interference when the joint is made up the next and succeeding times. If it were not for the vanishing thread form of the male member, which causes the gap and permits deformation of the female end, the angles $a$ and $b$ could be much greater than about 10°. The critical angle of about 5° to about 10° for the mating surfaces is necessary in the joint of the present invention in order to have the axial force component sufficiently large to prevent movement of the female member in either direction along these surfaces.

The secondary seal is provided between the end 16 of the male member and the internal annular shoulder 17a on the female member. The shoulders 17a are undercut preferably at the same angle as indicated in connection with the surfaces 14 and 15, and the ends of the male member 16 are undercut to the same angle in order to prevent the one member from climbing over the other as high torque is applied. However, since the metal-to-metal internal seal members are fully supported by complementary surfaces, the maximum angle may be about 20° rather than the about 10° maximum for the external seal.

As indicated above where the product is to be used in connection with corrosive media, the internal annular shoulder on the female member is preferably provided by a gasket 17. The gasket 17 is annular and is seated in a groove 18 in the coupling member 11 and as best seen in FIG. 3 is T-shaped in cross section having the flanges 17b and the shoulders 17c. The shoulders 17c are undercut at the same angle as indicated in connection with the surfaces 17a. Because of the tendency for the gasket 17 to be pulled out of the groove 18 by the force provided by the end of the male member, the undercut of the male member and the mating surface of the gasket should not exceed about 10°.

When the joint is stabbed and made up, the end of the male member abuts the surface 17c of the gasket and the flange 17b serves to prevent the gasket from being squeezed out during makeup. The undercutting of the surfaces 16 and 17c insures that the seal between these surfaces will not become separated if the joint is under tension loading.

The gasket 17 is preferably made of a halogenated hydrocarbon ester such as a fluorinated hydrocarbon ester available under the trademark TEFLON or a chlorinated hydrocarbon ester available under the trademark PENTON.

The machining tolerances of the joint are of such value and so arranged that if the internal shoulder is a separate corrosion resistant gasket the internal shoulder will butt first to insure sealing contact. If the internal shoulder is integral with the coupling or box member as seen in FIG. 1, either the external or internal shoulder may butt first with a maximum axial clearance of the other shoulder of 0.010 inch.

It will be understood that the gasket member 17 is particularly desireable where corrosive fluids are to pass through the pipe. For ordinary purposes, the shoulder constituted by the gasket 17 may be simply a portion of the coupling member 11 and integral therewith.

It will likewise be clear that a gasket of the same material as the gasket 17 may be provided between the surfaces 14 and 15 but this is generally not necessary.

Modifications may be made within the scope of this invention without departing from the spirit thereof. The embodiments of the invention in which an exclusive property or privilege is claimed are defined as follows:

I claim:

1. A joint for metallic tubular elements embodying male and female members having engageable threads of relatively long pitch disposed on a relatively steep taper, the said female member having full threads and the said male member having vanishing threads, the threads on said male member, when said joint is made up, being engaged throughout their length, and said male and female members having complementary conical sealing surfaces axially displaced and radially offset from said threads to make full conical surface contact throughout substantially their overlapped length with only surface deformation of the complementary sealing surfaces; said male member having an internal annular shoulder, said female member having an internal annular shoulder, the end of said female member abutting the external annular shoulder, said female member having an internal annular shoulder, the end of said female member abutting the external annular shoulder of said male member to prevent overtightening, and the end of said male member abutting the internal annular shoulder of said female member, when said joint is made up, to provide a leak-proof seal, the end of said female member and said external annular shoulder of said male member being undercut at an angle from about 5° to about 10° with respect to the radius of said joint, and the end of said male member and said internal annular shoulder being undercut at an angle from about 5° to about 20° with respect to the radius of said joint.

2. A joint according to claim 1, wherein said internal annular shoulder of said female member is provided by a gasket of a halogenated hydrocarbon ester, and wherein the maximum angle of undercut of the end of said male member and said internal annular shoulder is about 10° with respect to the radius of said joint.

3. A joint according to claim 2, wherein said gasket has a flange over which said male member extends, to prevent squeezing out of said gasket during makeup.

4. A joint according to claim 3, wherein said joint is a coupled and threaded joint, and said gasket has a T-shaped cross section with the cross bar of the said T seated in an annular groove in said female member substantially centrally of the coupling member of said joint.

5. A joint according to claim 1, wherein the male and female members are dimensioned such that when one of said external and internal annular shoulders makes contact the standoff on the other of said shoulders is not in excess of 0.010 inch, the elements which first abut being capable of slight deformation to permit sealing contact between the others of said elements.

6. A joint according to claim 2, wherein the male and female members are dimensioned such that the end of the pin member abuts the shoulder on said gasket before the external shoulder on said pin member makes contact with the end of said female member.

7. A joint according to claim 1, wherein said complementary tapered sealing surfaces are provided with a phonograph finish.

8. A joint according to claim 1, wherein said internal annular shoulder of said female member is formed in the metal of said female member.

UNITED STATES PATENT OFFICE
CERTIFICATE OF CORRECTION

Patent No. 3,572,777          Dated March 30, 1971

Inventor(s) Thomas L. Blose and Emilio A. Pontillo

It is certified that error appears in the above-identified patent and that said Letters Patent are hereby corrected as shown below:

On the title page, the last name of the second inventor should be "PONTILLO".

Claim 1, column 4, line 4, the word "internal" should be -- external --.

Claim 1, column 4, lines 6, 7 and 8, the entire phrase ", said female member having an internal annular shoulder, the end of said female member abutting the external annular shoulder" should be cancelled.

Signed and sealed this 9th day of May 1972.

(SEAL)
Attest:

EDWARD M. FLETCHER, JR.
Attesting Officer

ROBERT GOTTSCHALK
Commissioner of Patents

FORM PO-1050 (10-69)